US007668179B2

(12) United States Patent
Berger et al.

(10) Patent No.: US 7,668,179 B2
(45) Date of Patent: Feb. 23, 2010

(54) DYNAMIC ADJUSTMENT OF AAL2 TIMER_CU IN VOICE AND DATA MULTIPLEXING OVER AAL2 CONNECTIONS

(75) Inventors: Ricardo Berger, Kadima (IL); Avi Hagai, RaAnana (IL); Eran Kirzner, Rishon LeZion (IL); Ronen Weiss, Herzlia (IL)

(73) Assignee: Wintegra Ltd., RaAnana (IL)

( * ) Notice: Subject to any disclaimer, the term of this patent is extended or adjusted under 35 U.S.C. 154(b) by 873 days.

(21) Appl. No.: 10/911,592

(22) Filed: Aug. 5, 2004

(65) Prior Publication Data

US 2005/0008019 A1 Jan. 13, 2005

Related U.S. Application Data

(63) Continuation-in-part of application No. PCT/IL03/00098, filed on Feb. 6, 2003.

(60) Provisional application No. 60/354,256, filed on Feb. 6, 2002.

(51) Int. Cl.
*H04L 12/56* (2006.01)
(52) U.S. Cl. .............................. 370/395.64; 370/395.1
(58) Field of Classification Search .............. 370/395.1, 370/395.6–395.665
See application file for complete search history.

(56) References Cited

U.S. PATENT DOCUMENTS 5,889,761 A * 3/1999 Yamato ........................ 370/231
6,094,682 A * 7/2000 Nagasawa .................... 709/224
6,975,651 B1 * 12/2005 Ono et al. .................... 370/474
2002/0080816 A1 * 6/2002 Spinar et al. ................. 370/449
2002/0093962 A1 * 7/2002 Lo et al. ..................... 370/395.1
2002/0131457 A1 * 9/2002 Akiyama .................... 370/519
2003/0206525 A1 * 11/2003 Miyoshi et al. ........... 370/236.1
2004/0213157 A1 * 10/2004 Karlsson et al. ............. 370/235

FOREIGN PATENT DOCUMENTS

GB          2322515       8/1998
WO      WO 99/44390       2/1999
WO      WO 01/24570       5/2001
WO      WO 03/067921      8/2003

OTHER PUBLICATIONS

Menth et al. "A Scalable Scheduling Mechanism With Application To AAL2/ATM Multiplexing", Proceedings of the 14th ITC Special Seminar, p. 1-10, 2001. § '02.2—' 02.4, § '03.2, § '004, §'04.1, '04.2.

* cited by examiner

*Primary Examiner*—Phuc H Tran

(57) ABSTRACT

A method for determining at least one parameter for a particular AAL2 channel identifier (AAL2-CID), according to which the behavior of the transmission of the user information stream is determined per application. Preferably, the present invention enables the QOS (quality of service) for the user application to be determined by setting a plurality of such parameters for a specific AAL2 CID. The present invention preferably encompasses the ability to determine any parameter that is usually set for the ATM channel to instead be set for the CID separately. These parameters may be dynamically adjusted according to the real-time state of the system, channel and the specific CID. Additionally the selection and usage of said parameters may also be influenced by the real time state of the system, channel and the specific CID.

Examples of such parameters include, but are not limited to, traffic type, priority, any type of QOS parameter, timing parameters, and so forth.

9 Claims, 5 Drawing Sheets

DYNAMIC ADJUSTMENT OF AAL2 TIMER_CU IN VOICE AND DATA MULTIPLEXING OVER AAL2 CONNECTIONS

RELATIONSHIP TO EXISTING APPLICATIONS

The present application is a continuation in part of PCT Patent Application No. PCT/IL03/00098, filed on 6 Feb. 2003, which claims priority from U.S. Provisional Patent Application No. 60/354,256, filed on 6 Feb. 2002, the contents of which are hereby incorporated by reference in their entirety.

FIELD OF THE INVENTION

The present invention relates to the ability to adjust at least one parameter individually for a particular ATM Adaptation Layer Type 2 Channel Identifier (AAL2-CID), for example for selective transmission of time-sensitive data over an ATM (asynchronous transfer mode) network, and in particular, over AAL2 as the transport layer.

BACKGROUND OF THE INVENTION

ATM adaptation layer type 2 (AAL2) has been specified for the transmission of time-sensitive or delay-sensitive data through ATM networks (see for example ITU-T Recommendation I.363.2 which is hereby incorporated by reference; ITU-T is the Telecommunication Standardization Sector of the International Telecommunication Union). Examples of such data include, but are not limited to, voice data, video streams, and audio streams. Real-time voice data transmissions, as used for example in telephone conversations, are particularly delay-sensitive.

AAL2 also enables short length packets to be packed into one or more ATM cells, which are themselves of fixed length as known to those skilled in the art. AAL2 enables data from more than one user to be multiplexed into one protocol data unit (PDU), which in turn is contained in the payload portion of the ATM cell.

In the AAL2 model for ATM cells, the AAL2 layer sits over the ATM layer, and contains two sub layers, the Common Part Sublayer (CPS) and the Service Specific Convergence Sublayer (SSCS). The CPS sub layer provides information for identifying the users (data owners) and the data that each user owns. The SSCS sublayer connects the CPS sublayer to higher layer applications of the users.

The lowest layer is the ATM-cell itself, which is the unit of transmission. Each cell contains a header and the ATM-PDU (payload). The ATM-PDU portion in turn contains both the CPS-PDU (payload) and the start field, which is similar to a header. The CPS-PDU in turn contains one or more CPS packets, CPS-PP, and one or more CPS packet headers, CPS-PH. Each CPS packet may have a plurality of octets. Therefore, since each CPS packet may belong to a different user, each CPS-PDU may contain data from one or more users. The next sublayer is the SSCS, which features the SSCS-PDU (payload), and a header and trailer portion.

Voice data is particularly time sensitive. Therefore, data streams need to be multiplexed according to an assigned Quality of Service (QOS), in order to avoid excessive delays in the transmission of voice packets (or other units of voice data). According to the AAL2 standard, the QOS defines the maximum permissible delay, before the packet of voice data is sent.

The delay is timed according to the Timer_CU, which determines the maximum delay before a particular CPS-packet (which has at least one octet packed inside) is scheduled for transmission in a cell. Any cell that is not completely full in the payload portion, at the time that the packet is to be sent, has additional padding packed in order for the cells to maintain their fixed size. Therefore, the value for the Timer_CU needs to be set such that short latency is maintained, particularly for voice sensitive applications, while also maintaining high efficiency. If the value is too low, more partially full cells are likely to be sent, and efficiency suffers. On the other hand, if the value were too high, the quality of voice transmission would tend to degrade as the period of delay between transmission of packets increases.

Two methods for obtaining the desired value for the Timer_CU may be either to define this value according to the most time-sensitive application in the AAL2 virtual connection, or according to a compromise between conflicting demands of the various applications supported by the connection. The first method would cause all CPS packets associated with a particular AAL2 virtual connection or channel to be treated as the most sensitive application, even if the CPS packets in a particular CPS-PDU are data packets, which have low or no sensitivity to delays in transmission. Furthermore, if the value for the Timer_CU is less than the typical time required to deliver and pack a packet, each cell is more likely to contain only one CPS packet, with the rest of the space being filled with padding, assuming that the ATM layer rate is equal to or faster than the Timer_CU rate. Thus, the first method causes efficiency of bandwidth use to decrease, while increasing the overall amount of bandwidth required to transmit a given amount of data.

The second method provides more efficient use of bandwidth, since the timer value is now set to a compromise value for the delay for all packets in a given connection. However, typical data packets may still be transmitted less efficiently, since the transmission delay which can be tolerated by such packets is higher than average, while voice (and other time sensitive data) packets may be transmitted with unacceptably high latency.

Unfortunately, only these two extremes are possible in terms of a solution to the timing problem, since the Timer_CU is configured with a single value for all CIDs (channel identifier) for each AAL2 virtual connection or channel. Therefore, even if that connection or channel is used to transmit mixed types of data, the timer is set as though the data is of a homogeneous type.

SUMMARY OF THE INVENTION

The background art does not teach or suggest the ability to set a timer for determining when an ATM cell is transmitted according to the data actually contained in the cell. In addition, the background art also does not teach or suggest setting such a timer according to the requirements of different types of data from different types of applications. The background art also does not teach or suggest the ability to determine a value for at least one parameter specifically for a CID (channel identifier) connection.

The present invention overcomes these deficiencies of the background art by providing a method for determining at least one parameter for a particular AAL2-CID connection. AAL2 is the particularly preferred standard for use with the method of the present invention, because it is able to support such features as transmitting a plurality of user information streams on each ATM connection, and hence for each AAL2-CID connection.

Preferably, the present invention enables the QOS (quality of service) for the CID connection to be determined by setting a plurality of such parameters for the CID connection. The present invention preferably encompasses the ability to determine any parameter which is usually set for the ATM channel to instead be set for the CID connection separately. Examples of such parameters include, but are not limited to, traffic type, priority, any type of QOS parameter, timing parameters, and so forth. The value of these parameters may be optionally and preferably adjusted dynamically by the user.

Preferably, the user is able to configure such parameter(s) for each CID connection separately. These separate configurations are preferably then collected and translated to one class of parameters to be performed during transmission as a characteristic of the channel itself. Such translation is more preferably performed dynamically in real time in order to balance the set values for these parameters. Most preferably, if the requested configuration by the user cannot be supported by the system, such that the system cannot provide the requested QOS, then the configuration is rejected and the configured parameter values are not used. A new set of parameters may be optionally and preferably renegotiated by the control application layer.

The present invention also provides a method for dynamic adjustment of the time interval for transmitting a cell over an ATM network. The method of the present invention enables the time interval to be determined for both maximum efficiency of bandwidth usage over the network, while still enabling data to be transmitted within the confines of the maximum permissible transmission delay of data from the most time-sensitive application contained in a cell. Thus, the method of the present invention is particularly suitable for use with a mixture of time sensitive data, which is data from time sensitive and/or latency sensitive applications, and data which is not time sensitive and/or otherwise has different demands of the network.

As defined herein, "time sensitive" refers to a function which suffers from degradation of the quality of its operation from a delay in transmission of data required for that function over a network. Examples of time sensitive functions include, but are not limited to, voice communication, and playing back streaming audio and/or video data.

BRIEF DESCRIPTION OF THE DRAWINGS

The foregoing and other objects, aspects and advantages will be better understood from the following detailed description of a preferred embodiment of the invention with reference to the drawings, wherein.

DESCRIPTION OF THE PREFERRED EMBODIMENTS

Figure 1:
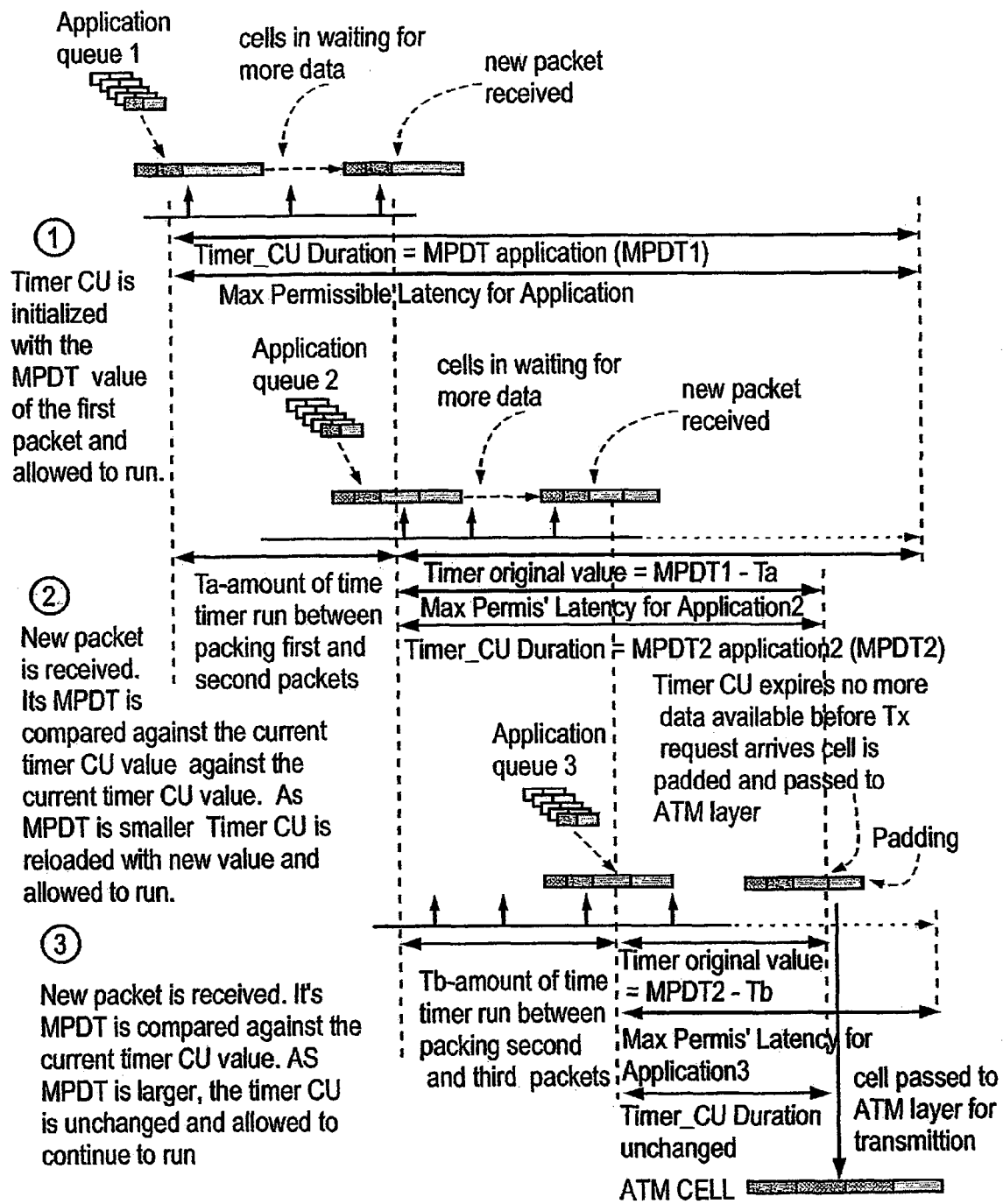
FIG. 1 is a schematic block diagram of a first exemplary implementation of the dynamic timer according to the present invention.

The present invention is of a method for determining at least one parameter for an AAL2-CID connection, according to which the behavior of the user information stream for any one of processing or transmission, or a combination thereof, is determined. Processing optionally and preferably includes all complementary tasks that are required for transmission and/or are performed in addition to transmission.

Preferably, the method of the present invention adjusts the behavior of the user information stream for a particular AAL2-CID connection, such that the method includes adjusting at least one parameter for each application of a plurality of applications which transmit user information streams through a shared ATM virtual connection (ATM-VCC). This parameter preferably at least partially determines QOS for the transmission of application data. Parameter adjustment includes adjusting the parameter value and/or the parameter type.

Therefore, the method optionally and preferably adjusts the behavior, more preferably the timing of transmission, according to the data quantum being transmitted. Thus, such behavior is more preferably determined at least partially according to the nature of the application generating the data.

Preferably, the method of the present invention is capable of affecting one or more processing tasks by setting such parameters. Illustrative examples of the processing tasks include, but are not limited to, stream monitoring, for example for billing, interrupt event, and session life-time; congestion control, for example for resource allocation; routing information, for example for forwarding decision, forwarding database (per virtual private network (VPN) data base), packet encapsulation and processing; and stream QOS, for example for scheduling method and traffic parameters, transmission priority, segmentation/reassembly characteristics, and queuing/dequeuing methods/characteristics. Reassembly characteristics relate to methods for reassembling cells or packet into a frame or other data unit. Segmentation is also described in greater detail below.

With regard to stream monitoring, which is an optional but preferred example of a processing task, the monitoring is preferably performed according to the MIB (Management Information Base). Stream monitoring is preferably performed for such tasks as billing, for example to determine the amount of bandwidth being used by the user and/or the proportion of overall bandwidth being used by the user. Stream monitoring may also optionally and preferably be performed for determining handling of an interrupt event, for notification of a network event. An alternative method is polling. Therefore, stream monitoring may optionally be used to determine when and how to handle interrupts, according to the behavior of the user information stream being monitored.

Stream monitoring may also optionally be used for session life-time determination, such as determining that a session features a static stream that is always kept open, or alternatively waiting for the occurrence of a particular event to close the session. Also alternatively, the session may optionally be closed automatically according to some criteria.

The one or more processing tasks may also optionally and preferably include resource allocation, which affects QOS but which is not directly related to transmission. Resource allocation may optionally include such tasks as determining the size of the buffer allowed for session, which helps to determine latency for each session. Such adjustments are preferably made for individual sessions rather than averaging the adjustments over all applications, and may also optionally include the type of buffer, or a definition of any other resource(s) that the session must take from the overall system, including but not limited to priority of interrupt, overall priority for resources, determining allocation of a pool of resources and so forth.

Stream monitoring may also optionally be used for routing information, user information stream QOS, or a combination of any of the above.

Preferably, the present invention enables the QOS for the CID connection to be determined by setting a plurality of such parameters according to the CID. The present invention preferably encompasses the ability to determine any parameter which is usually set for the ATM channel to instead be set for the CID connection separately. Examples of such parameters include, but are not limited to, traffic type, priority, any type of QOS parameter, timing parameters, and so forth.

Preferably, the user is able to configure such parameter(s) for each CID connection separately. These separate configurations are preferably then collected and translated to one class of parameters to be performed during transmission as a characteristic of the channel itself. Such translation is more preferably performed dynamically in real time in order to balance the set values for these parameters. Most preferably, if the requested configuration by the user cannot be supported by the system, such that the system cannot provide the requested QOS, then the configuration is rejected and the configured parameter values are not used.

The present invention also encompasses a method for dynamic adjustment of the time interval for transmitting a cell over an ATM network. Preferably, the time interval is dynamically adjusted through dynamic adjustment of a timer, which determines (directly or indirectly) when a cell is transmitted. This timer is optionally and preferably the Timer_CU, according to the preferred but exemplary implementation of the present invention with the AAL2 model for ATM networks. The Timer_CU is preferably set according to the maximum latency of data from the most time sensitive application in a CPS_PDU, rather than being set for a particular AAL2 channel overall.

According to a preferred embodiment of the present invention, preferably an individual maximum packetisation delay threshold (MPDT) timer value is set for each application according to the needs of that application. Optionally and more preferably, the user is able to set the MPDT timer value for each application. For example, highly time sensitive applications, such as for high quality audio and/or video data, preferably would have a lower (more time sensitive) value for the MPDT timer. Therefore, the user is able to determine latency according to the needs of applications in the system of the user, rather than compromising on these needs because of the presence of other applications which happen to share the same logical connection. The user may dynamically adjust the value of the MPDT timer according to the state of the system. For example if the system is heavily congested, the MPDT value of data applications (e.g. ftp) may be increased in order to improve bandwidth usage by the AAL2 ATM cells. Alternatively, if the system is lightly loaded the MPDT timer value may be lowered, thus shortening the latency of the associated application.

Next, preferably the MPDT timer values for the different types of application data contained in the CPS_PDU are compared, and the Timer_CU is then preferably determined according to the most time sensitive data contained in that particular CPS_PDU.

According to other preferred embodiments of the present invention, time sensitivity (and hence the MPDT timer values) is determined according to at least one additional characteristic of the data, apart from the type of function and/or application producing and/or requiring that data. For example, the source of the data may also optionally be considered as such an additional characteristic. Optionally and more preferably, the additional characteristic may include a parameter such as traffic type for example, which is given a priority and weight. This information is more preferably incorporated into the decision regarding the timing of transmission of the data. If a plurality of sessions featuring high quality audio and/or video data is being performed, then one or more such sessions may optionally be given priority for data transmission if at least one user in such a session has subscribed to a premium service, for example. As another example, the transmission of data from high quality audio applications may optionally be given priority over other types of streaming data transmissions.

The method of the present invention enables the time interval to be determined for both maximum efficiency of bandwidth usage over the network, and particularly through an individual virtual connection of the ATM network, while still enabling data to be transmitted according to the maximum permissible transmission delay of data from the most time-sensitive application contained in a cell. Thus, the method of the present invention is particularly suitable for use with time sensitive data, which is data from time sensitive and/or latency sensitive applications.

The principles and operation of a device and method according to the present invention may be better understood with reference to the drawings and the accompanying description.

Turning now to the drawings, FIG. 1 is a schematic block diagram of a first exemplary implementation of the dynamic timer according to the present invention. As shown in stage 1, an application queue provides CPS packets to be packed into an ATM cell. A timer according to the present invention, which in this preferred embodiment is the Timer_CU, is preferably initialized with the MPDT value of the first packet to be packed into the cell. More precisely, preferably when the first octet is packed to the CPS_PDU, a real-time timer is loaded with the MPDT value of the application associated with that octet. This timer (in the preferred example, the Timer_CU) continues to run while the packing process continues. In stage 1, the Timer_CU duration and hence the maximum time to transmission of the cell, is set to the maximum latency permitted for the application providing data for that first packet (MPDT of application1). For the purposes of explanation only and without any intention of being limiting, Timer_CU is assumed to be a decremental timer. An incremental timer could also optionally be used. Optionally, Timer_CU could be initialized with a default value.

In stage 2, a new packet is received and added to the cell. The MPDT of this new packet is compared against the current Timer_CU value. In this example, the MPDT of the data, or more precisely of the application providing this data (application2), is lower for the new packet than for the current value of Timer_CU (which is now at the value of MPDT of application1, minus the time elapsed between packing the first and second packets). Therefore, the value for the Timer_CU is preferably adjusted according to the MPDT of application2. More preferably, Timer_CU is reset to the value of MPDT of application2.

In stage 3, a third new packet is received. Since the MPDT of the application providing the data for this new packet (application3) is larger than the current value of Timer_CU, the value of Timer_CU is not changed. Once Timer_CU has expired, the packed cell (whether full or only partially packed with data) is sent to the ATM layer for transmission.

Figure 2:
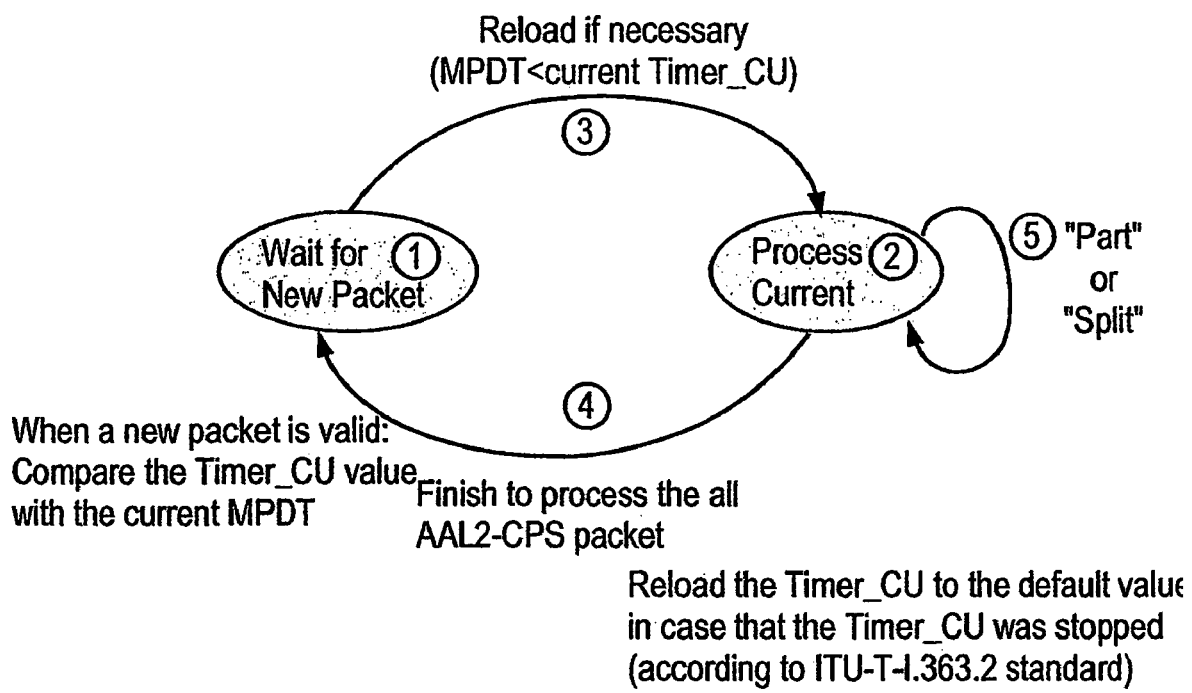
FIG. 2 is a schematic diagram of an exemplary dynamic timer state machine according to the present invention.

FIG. 2 is a schematic diagram of an exemplary dynamic timer state machine according to the present invention. As shown, in state 1, the AAL2 CPS sublayer is waiting for a valid AAL2-CPS packet. Timer_CU may optionally already have started running, for example if at least one packet (and/or a partial or split packet) was already packed. In this state, Timer_CU has not expired.

Next, for the arrow labeled "3", a new AAL2-CPS packet is ready to be packed by the AAL2 CPS sublayer. This sublayer compares the current Timer_CU value (if the timer is already active) with the new MPDT. In the exemplary (but non-limiting) illustrative timer shown here, Timer_CU is decremental. Therefore, if MPDT is lower than the value of the Timer_CU, or if no Timer_CU value has been loaded, then the Timer_CU is (re)loaded with the value of MPDT. If the new packet is in a partial or split state, the Timer_CU is preferably reloaded with the MPDT value of this packet. In the partial or split state, a packet may extend over 2-3 cells. Once the AAL2 layer starts packing the partial/split packet, the first CPS-PDU is certain to be passed to the ATM layer for transmission. Therefore, there is no need to run the Timer_CU for the other octets contained in the CPS-PDU. However, there might be no data available to fill the remaining octets in the second CPS-PDU, therefore according to the standard, this CPS-PDU should wait for either more data to become available or for the Timer_CU to expire. The standard also dictates that Timer_CU period should start with the first octet of the CPS packet being packed to a CPS-PDU, such that the Timer_CU must be initiated when starting to pack the partial (split) CPS packet.

The Timer_CU is then either reactivated (if a new value has been loaded) or is allowed to continue running.

In state 2, the AAL2 CPS sublayer processes the current packet and inserts it into the AAL2 CPS_PDU. During this state, the Timer_CU continues to run.

Next, for the arrow labeled "4", the AAL2 CPS sublayer finishes packing the current CPS packet into the AAL2 CPS_PDU. When the Timer_CU is stopped or expired, as defined in the standard ITU-T I.363.2, previously incorporated by reference, the cell is transmitted. Otherwise the Timer_CU would be allowed to continue to run. In the event where the Timer_CU was stopped it may be optionally either reloaded by a default value or it might only be loaded with the MPDT of new packet (arrow "3"), in any event it would only be activated once a new packet arrives (arrow "4").

As shown in "5", the AAL2 CPS sublayer starts processing the remainder of a "part" or "split" packet in a new CPS_PDU. The Timer_CU continues to run as previously described.

Optionally and preferably, credit is accumulated for ATM transmit requests where no CPS_PDU is delivered to the ATM layer, as compensation for lost bandwidth.

Figure 3:
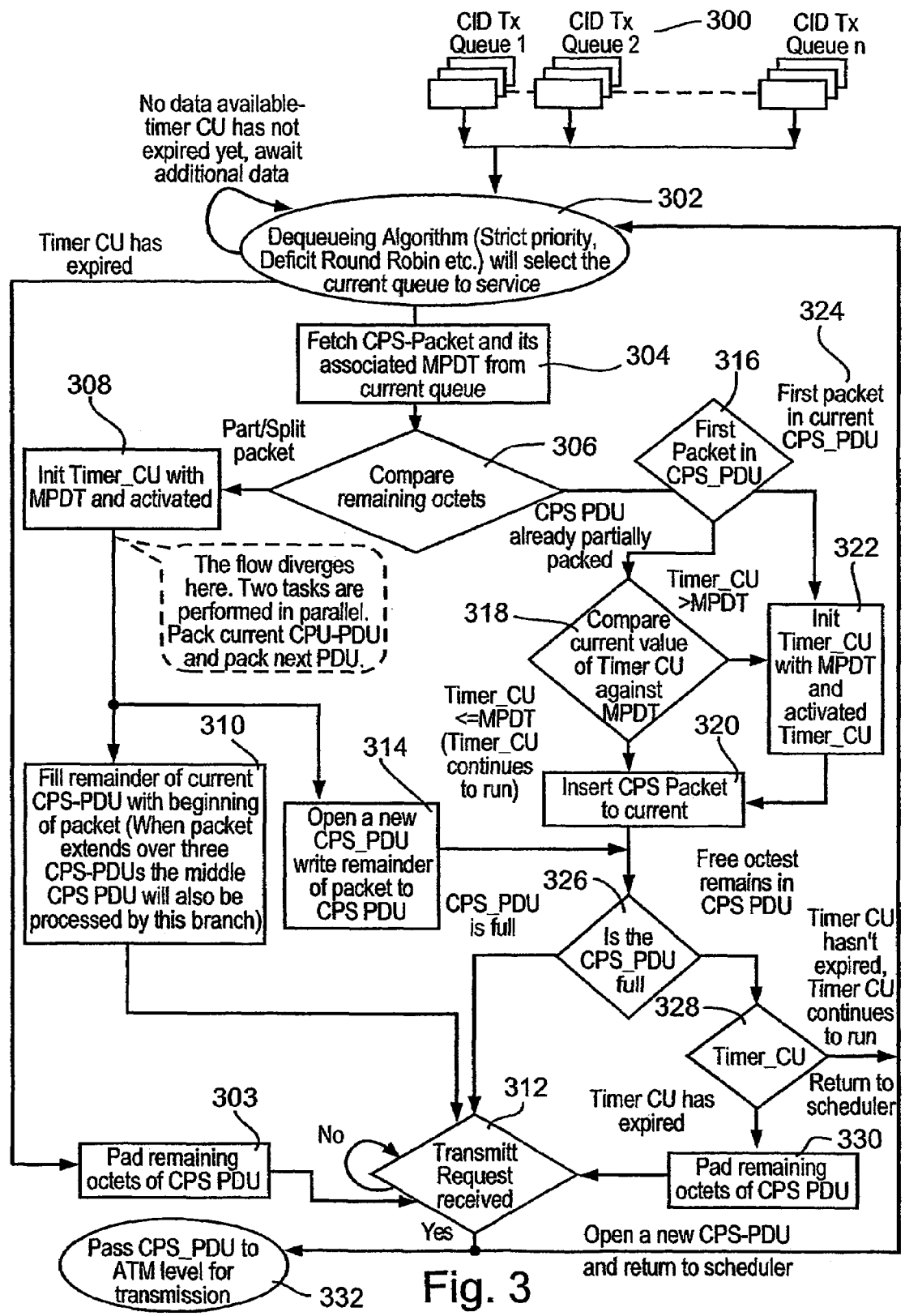
FIG. 3 shows a flow of operations for packing and transmitting data.

According to an optional embodiment of the present invention, the method of the present invention may be implemented with a system featuring (as an example), a maximum of 255 transmit queues, a scheduling unit, an AAL2 processor, Timers, and an ATM layer scheduler, as shown with regard to FIG. 3.

The transmit queues, shown with regard to reference 300, contain both the CPS packets that are destined for transmission, and parameters associated with this specific queue (i.e. MPDT). Each application running over this AAL2 channel (virtual connection or virtual channel) may optionally and preferably use an individual queue. Alternatively, if the QOS requirements, and hence the parameters (contained in the queue) are the same, several applications, with the same characteristics, may optionally and preferably be bundled together and use the same queue.

The scheduling unit is responsible for deciding which queue to process next. Various algorithms may optionally be used by the scheduling unit (i.e. Strict Priority, Deficit Round Robin, etc.). The CPS scheduling unit decides which queue to process next, as shown with regard to reference 302. However, if the Timer_CU has expired, then the remaining octets of the CPS_PDU are padded, as shown with regard to reference 303. Otherwise, this scheduling unit then fetches a CPS packet from a specific transmit queue, with the parameters associated with this queue (preferably specifically including the MPDT parameter), as shown with regard to reference 304.

The AAL2 processor then compares the remaining octets in the current CPS_PDU, as shown with regard to reference 306. The AAL2 processor would then preferably insert the new CPS-packet to the current CPS_PDU. If the CPS-packet is a part or split packet, such that the received current CPS packet may extend over an additional CPS-PDU (or two additional CPS_PDUs), preferably the Timer_CU is initiated with the received MPDT of the current packet and activated (as shown with regard to reference 308). The processor more preferably activates the Timer_CU simultaneously with writing the beginning of the CPS-packet into the current CPS-PDU, as shown with regard to reference 310. The current (full) CPS_PDU is then transmitted once a transmission request is received from the ATM layer scheduler, as shown with regard to reference 312. (Note that the ATM layer scheduler may base the transmission requests on additional factors, such as the traffic contract and/or system state.) A new CPS_PDU is opened and the remainder of the CPS-packet is inserted to it, as shown with regard to reference 314. The processor preferably continues to perform the process described below for a partially filled CPS-PDU.

If the CPS-packet does not extend to the next cell, and if the CPS-packet is not the first packet in the CPS_PDU (as determined in decision block 316) the processor would preferably compare the value of the received MPDT against the current value of the Timer_CU, as shown with regard to reference 318. If the value of Timer_CU is smaller than MPDT, then the CPS packet is inserted into current CPS-PDU and Timer_CU is allowed to continue to run, as shown with regard to reference 320. If the value of the Timer_CU is larger than MPDT, then the decremental timer which is used to implement Timer_CU is preferably initiated with the value of the new MPDT, as shown with regard to reference 322. The decremental timer is preferably activated simultaneously with writing the CPS-Packet to the cell. It should be noted that when the new CPS-packet is the first in the current CPS_PDU, as shown with regard to reference 324, the Timer_CU is preferably always initiated with the received MPDT.

When packing of CPS packet to the cell has ended, the CPS_PDU is checked to see if it is full, as shown with regard to decision block 326. If the CPS-PDU is not full, the value of Timer_CU is checked to see if it has expired, as shown with regard to reference 328. If the Timer CU has not expired, then CPS scheduling unit is preferably run again and a new queue is selected. When no data is available (all queues are empty) the current CPS-PDU is preferably stored at a temporary location until more data is available or the Timer_CU has expired. When new data is available, the process described above is preferably performed again. When Timer_CU has expired, the remaining part of the CPS-PDU is padded with a zeros pattern, as shown with regard to reference 330, and transmitted once a transmission request is received from the ATM layer scheduler.

When the CPS_PDU is full (with valid CPS packets), it is also transmitted once a transmission request is received from the ATM layer scheduler. Transmission is shown with regard to reference 332.

In the preferred embodiment, when a current CPS packet extends over more than one ATM cell the MPDT of the current packet affects the Timer CU value, and hence the transmission, of all cells containing the current CPS packet. Preferably, while the first cell is processed the timer CU of all subsequent ATM cells containing the CPS packet are reinitialized, in order to ensure that the last cell containing current split/partial CPS packet suffers a latency no greater than the current packet's MPDT.

Figure 4:
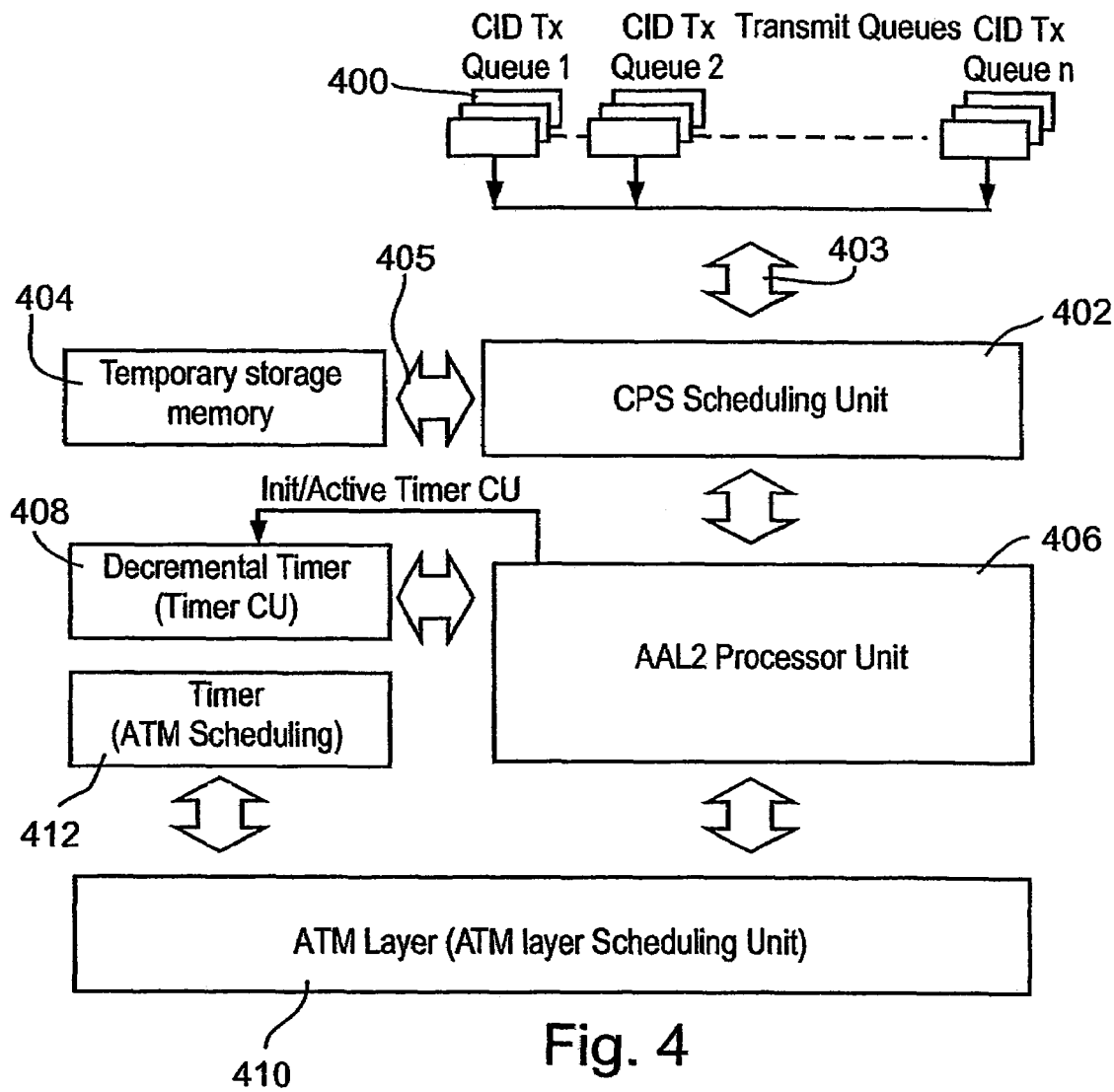
FIG. 4 is a schematic diagram of an exemplary switch according to the present invention.

FIG. 4 shows another embodiment of the present invention, which is of an exemplary ATM AAL2 switch. The AAL2 switch may also serve as an interworker, for interconnecting networks with different protocols. It should be noted that although this example is given with regard to AAL2, the switch may optionally be implemented for any type of ATM network. Also, the switch may optionally be implemented as a combination of hardware and software, or alternatively may be implemented entirely in hardware.

This switch may optionally receive input from a plurality of transmit queues 400 as shown. The information stream is received by a CPS scheduling unit 402 and may optionally be stored in a temporary storage memory 404, such as RAM (random access memory) or any other type of memory device. A bus 403 may optionally and preferably be present between plurality of transmit queues 400 and CPS scheduling unit 402; a bus 405 may also optionally and preferably be present between temporary storage memory 404 and CPS scheduling unit 402. Alternatively, all of the components of the switch may optionally be located on a single device, apart from plurality of transmit queues 400 and temporary storage memory 404, which would need to communicate (directly or indirectly) through a bus. Preferably, temporary storage memory 404 is also able to store QOS parameters and/or packet descriptors, including but not limited to, traffic type, priority, MPDT and so forth, for an AAL2 virtual connection and/or for the applications laying over the AAL2 virtual connection. Alternatively, a different memory could store this information (not shown). A packet descriptor characterizes general packet handling factors, such as data packet length, memory location of packet data unit, and transmission status, which do not directly affect QOS but may be taken into account during transmission.

The data is then received by an AAL2 processor unit 406, which preferably comprises a dynamic Timer_CU mechanism 408. CPS scheduling unit 402 and AAL2 processor unit 406 are preferably located on the same processing unit (not shown). The AAL2 processor unit 406 is preferably able to determine the value with which the Timer_CU (shown as a decremental timer for the purposes of illustration only) should be initiated. The initiation value is more preferably determined according to the MPDT parameter and/or one or more other predefined parameters, defined by the user.

The CPS-PDU may then be passed to an ATM layer 410, according to the value of Timer_CU and the virtual channel state maintained by the processing unit. The channel state maintenance is preferably performed by the AAL2 processor unit 406 component of the processing unit.

The ATM layer 410 may optionally use an additional timer (shown as an ATM scheduling timer 412) to ensure proper traffic management, shaping, bandwidth allocation and QOS at the level of the ATM. ATM scheduling unit 412 can be implemented as a combination of hardware and software, or alternatively entirely in hardware. Multiple solutions for scheduling ATM layer traffic are known in the art (such as 5 level hierarchical shaping, strict priority hardware queue, calendar wheel method, etc).

Figure 5:
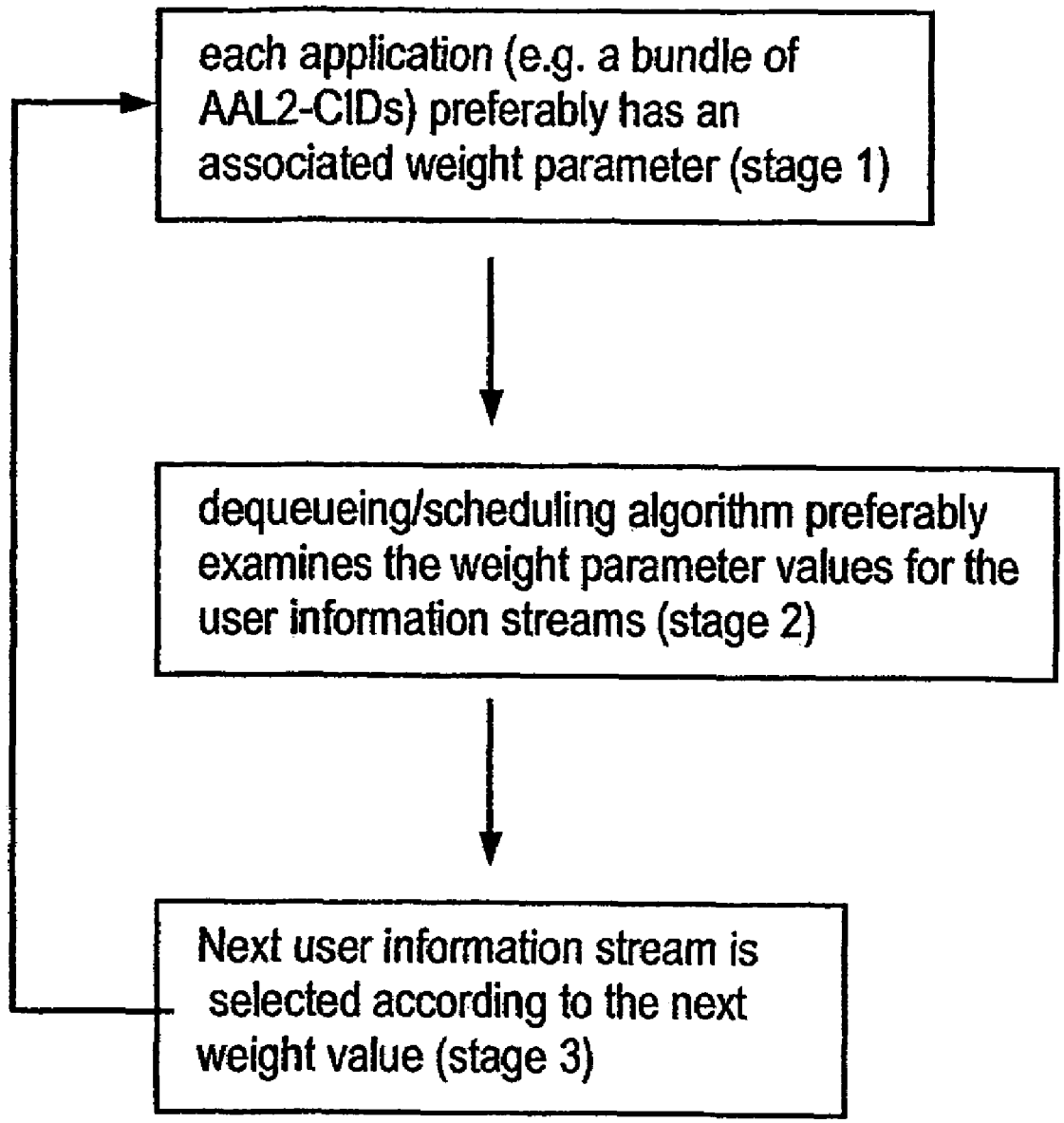
FIG. 5 is a flowchart of another exemplary method according to the present invention for dequeuing.

FIG. 5 is a flowchart of another exemplary method according to the present invention for dequeuing. This method is based on determining values for a set of parameters for each CID. The method would preferably allocate to each application, and in particular to each AAL2-CID, an appropriate bandwidth to transmit the user information data stream. There are many well-known algorithms that may optionally be used here, such as Deficit Round Robin (DRR), Round Robin (RR), Weighted Round Robin (WRR), strict priority (SP), hybrid dequeuing method (which combines the strict priority algorithm with WRR), as well as any other suitable algorithm, such as any suitable shaping and/or scheduling algorithm. The algorithm should preferably permit different traffic characteristics to be determined separately for each application, for example to divide bandwidth. Suitable algorithms may optionally be found in AF-TM 0121.00 (a reference of the ATM forum technical committee for Traffic Management Specification 4.1; see http://www.atmforum.com as of Jan. 30, 2003, which is hereby incorporated by reference as if fully set forth herein), for non-limiting, illustrative examples of suitable algorithms. Traffic shaping is described for example on pages 40 and 41 of this reference, as allowing the traffic characteristics of a stream of cells on a connection to have better network efficiency, while also fulfilling the QOS parameters. Appropriate algorithms and also the characteristics of such algorithms are also described in the reference.

A specific, non-limiting example of the method may optionally use the weighted round robin (WRR) algorithm, as shown with regard to FIG. 5. First, each application (e.g. a bundle of AAL2-CIDs) preferably has an associated weight parameter, as shown in stage 1. Next, in stage 2, the dequeuing/scheduling algorithm preferably examines the weight parameter values for the user information streams, to determine which weight value is now being processed. More preferably, the algorithm continues to process (dequeue) a specific user information stream until its weight value has expired. In stage 3, the next user information stream is selected according to the next weight value. Optionally and preferably, the process may be repeated cyclically in order to continue to transmit user information streams.

It will be appreciated that the above descriptions are intended only to serve as examples, and that many other embodiments are possible within the spirit and the scope of the present invention.

What is claimed is:

1. A method for dynamic adjustment of a time interval for transmitting a cell over an AAL2-CID (Asynchronous transfer mode (ATM) adaptation layer type 2-channel identifier) virtual connection in an ATM network, the virtual connection having a given quality of service applicable to a plurality of cells in the virtual connection, the method comprising:
   determining the time interval per cell according to a time sensitivity of at least one type of data-quantum in the cell, thereby providing different cells with respectively different time intervals within said AAL2-CID virtual connection, wherein the time interval is determined by dynamically adjusting a timer for determining when the cell is transmitted, wherein said timer is set according to a time sensitivity of a most time sensitive application currently in the cell, and wherein said timer is the combined use timer (Timer_CU), and the cell is packed according to the AAL2 model, and
   transferring cells within said network according to said determination.

2. The method of claim 1, wherein the Timer_CU is set according to the maximum latency of data from the most time sensitive application providing data to a CPS-PDU of the cell.

3. The method of claim 2, wherein an individual maximum packetization delay threshold (MPDT) timer value is set for each application, and if said MPDT value for a packet is closer to an expiration time than said Timer_CU value, said Timer_CU is reset to said MPDT value.

4. The method of claim 3, wherein said MPDT timer value is determined according to at least one additional characteristic of the application.

5. The method of claim 3, wherein if the current packet is partial or split, said Timer_CU is always restarted with said MPDT timer value of the current packet.

6. The method of claim 3, wherein if the current common part sublayer (CPS) packet extends over more than one ATM cell, the Timer_CU of each of said more than one ATM cell is affected by the MPDT timer value of said current CPS packet.

7. The method of claim 6, wherein the Timer_CU of each of said more than one ATM cell is settable to a value not greater than the MPDT timer value of said current CPS packet.

8. The method of claim 6, wherein said affecting comprises reinitializing, while processing a first cell containing said current CPS packet, the respective Timer_CU of subsequent cells containing said current CPS packet, such that each of said subsequent cells has a latency no greater than said MPDT timer value of said current packet.

9. The method of claim 3, wherein credit is accumulated for ATM transmit requests where no protocol data unit (PDU) is delivered to said ATM layer, as compensation for lost bandwidth.

* * * * *